United States Patent [19]

Shigeoka et al.

[11] Patent Number: 5,506,935
[45] Date of Patent: Apr. 9, 1996

[54] FUZZY INFERENCE APPARATUS

[75] Inventors: Fumiaki Shigeoka; Masanari Oh, both of Fukuoka, Japan

[73] Assignee: Rohm Co., Ltd., Kyoto, Japan

[21] Appl. No.: 340,476

[22] Filed: Nov. 14, 1994

Related U.S. Application Data

[63] Continuation of Ser. No. 85,045, Jul. 2, 1993, abandoned.

[30] Foreign Application Priority Data

Jul. 10, 1992 [JP] Japan ..................................... 4-184136

[51] Int. Cl.$^6$ ..................................................... G06G 7/48
[52] U.S. Cl. ................................................. 395/3; 395/900
[58] Field of Search .................................. 395/3, 61, 900

[56] References Cited

U.S. PATENT DOCUMENTS

| | | | |
|---|---|---|---|
| 4,507,726 | 3/1985 | Grinberg et al. | 364/200 |
| 4,623,961 | 11/1986 | Mackiewicz | 364/147 |
| 5,121,466 | 6/1992 | Zhang | 395/3 |
| 5,131,071 | 7/1992 | Tsutsumi et al. | 395/900 |
| 5,175,824 | 12/1992 | Soderberry | 395/325 |
| 5,185,849 | 2/1993 | Miyazawa et al. | 395/3 |
| 5,222,191 | 6/1993 | Enomoto | 395/3 |
| 5,329,431 | 7/1994 | Taylor et al. | 362/85 |

FOREIGN PATENT DOCUMENTS 2-89103  3/1990  Japan ................................ G06F 9/44

OTHER PUBLICATIONS

Mizumoto, "Recent Fuzzy Control Method", Mathematical Science, No. 333, Mar. 1991, pp. 20–26.
Mizumoto, "Realization of PID Controls By Fuzzy Control Methods", IEEE Int'l Conf on Fuzzy Systems, Mar. 8–12, 1992, pp. 709–715.

Primary Examiner—Robert W. Downs
Attorney, Agent, or Firm—Oliff & Berridge

[57] ABSTRACT

A fuzzy inference apparatus wherein basic operation blocks used in each step of the fuzzy inference process are respectively constituted as an independent operation block and are detachable. It is preferable that a plurality of operation blocks with different basic operation systems are prepared for all or some steps of the fuzzy inference process and inputs/outputs of different basic operation blocks in the same step are compatible.

5 Claims, 9 Drawing Sheets

FUZZY INFERENCE APPARATUS

This is a Continuation of application Ser. No. 08/085,045 filed Jul. 2, 1993, now abandoned.

BACKGROUND OF THE INVENTION

1. Field of the Invention

The present invention relates to an apparatus for performing fuzzy inference based on fuzzy information and knowledge for control, pattern recognition, or decision making.

2. Description of the Related Art

The fuzzy inference realizes very human decisions and analyses, which had previously been the weak points of machines, by providing a technique for numerically handling fuzzy knowledge and information and therefore, it has been used in various fields in recent years. Especially, the fuzzy inference is practically used in such fields as control, recognition, and diagnosis and is familiar to the public through home electrical appliances.

Conventional methods for realizing the fuzzy inference depend on software which is advantageous in view of the degree of freedom and flexibility for design. In application fields where higher speed is required, however, development of hardware dedicated to the fuzzy inference such as fuzzy operation processors and fuzzy chips has progressed. It is a problem in these pieces of hardware to decide what system of operation should be used as concrete means of the fuzzy inference. The following is a description of the process of fuzzy inference.

For fuzzy inference, knowledge is expressed by the following "if-then rule".

if x=A and y=B then z=C

The part "if x=A and y=B" is called an antecedent part and the part "then z=C" is called a consequent part. When human knowledge is expressed by the if-then rule, the antecedent part A and B and the consequent part C usually include fuzziness. The fuzzy inference makes it possible to numerically perform inference based on knowledge having fuzziness by describing the above A, B, and C with membership functions of the fuzzy set theory. In the above example, the antecedent part has two propositions. However, it is possible for the antecedent part to have one proposition or more than two propositions.

if x=A1 and y=B1 then z=C1 if x=A2 and y=B2 then z=C2 if x=An and y=Bn then z=Cn

According to the above rule, inference is performed by the following process.

Step 1: How actually given inputs "x" and "y" coincide with the antecedent parts A1 . . . , and An, and B1 . . . , and Bn respectively, that is, the fidelity is computed.

Step 2: When a plurality of propositions are present in the antecedent part, a fidelity as one rule is computed from the fidelity obtained for each proposition. For example, the minimum operation (MIN) between the fidelities of propositions is performed.

Step 3: A conclusion is extracted for each rule by using the fidelity obtained in Step 2. For example, the rule consequent-part membership function is truncated by the fidelity (minimum operation between the fidelity and consequent-part membership function).

Step 4: The conclusion for each rule extracted in Step 3 is unified for all rules to obtain the entire conclusion. For example, the maximum operation (MAX) of the conclusion for each rule is used.

Step 5: A non-fuzzy definite value is obtained from the inference conclusion obtained in Step 4 (which is a fuzzy set and described by the membership function). For example, the barycenter value of the membership function showing the conclusion is computed.

As described above, the process of the fuzzy inference comprises a plurality of steps.

Figure 8:
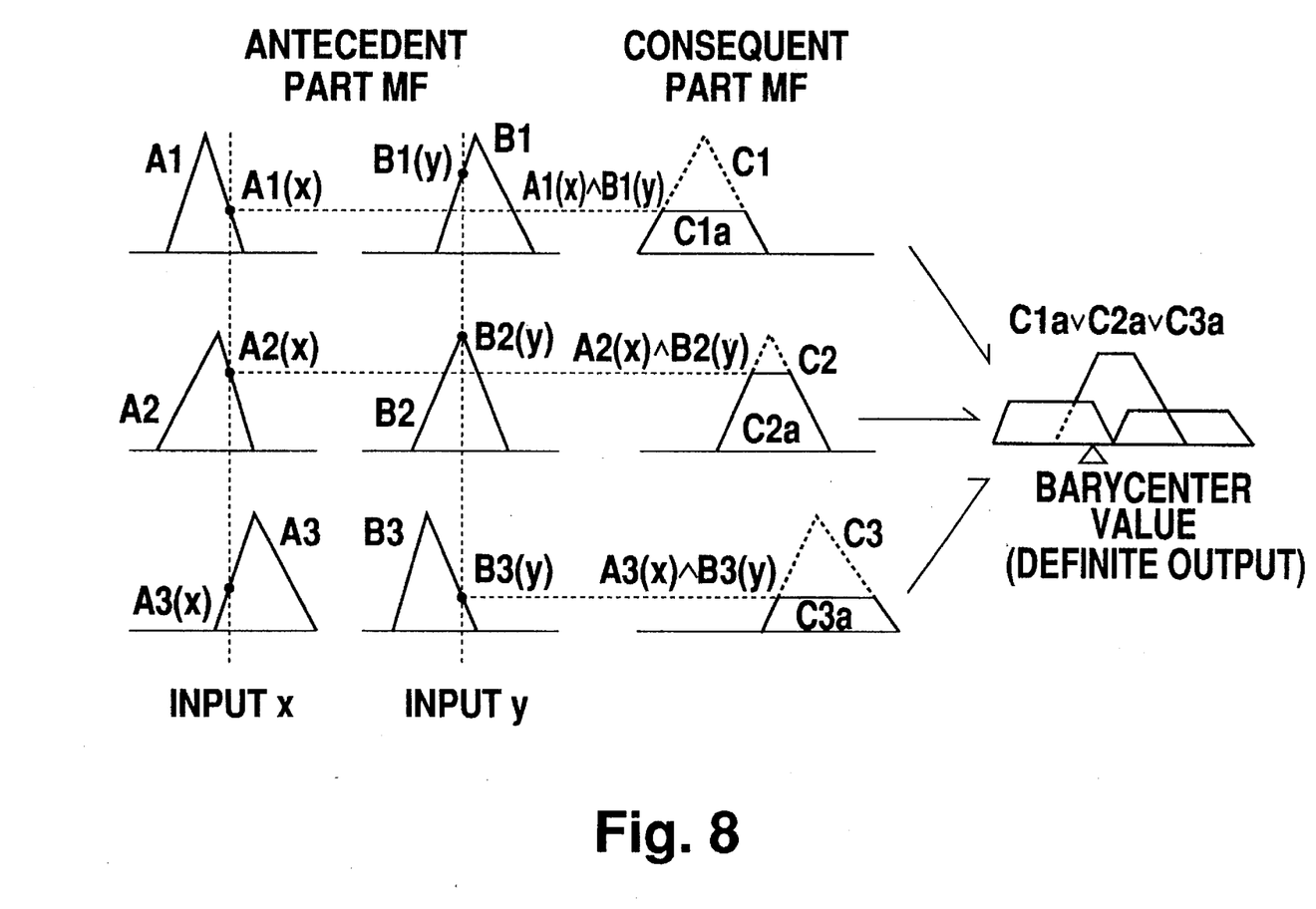
FIG. 8 shows a conceptual diagram of fuzzy inference according to the Mamdani method.
Figure 9:
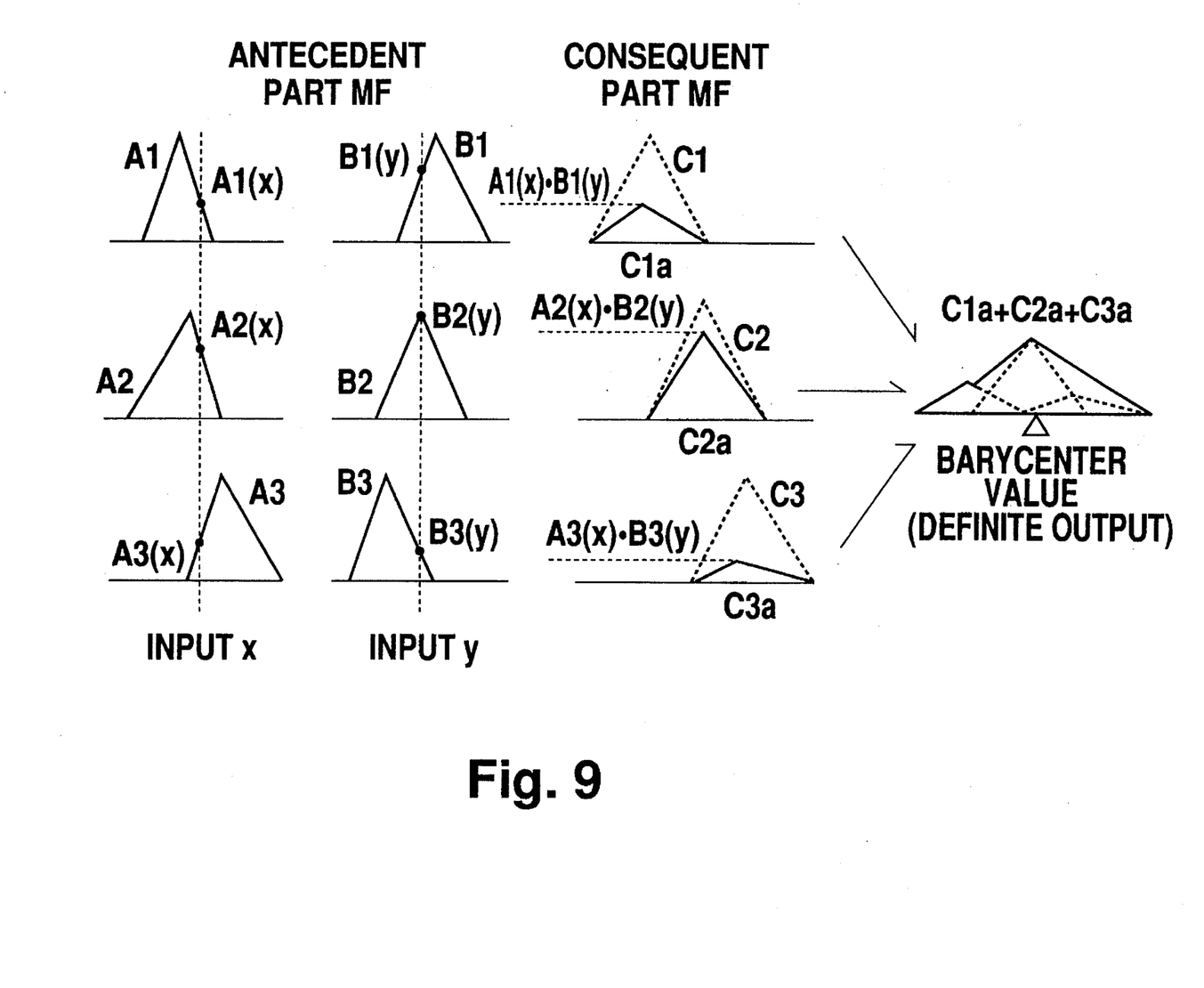
FIG. 9 shows a conceptual diagram of fuzzy inference according to the algebraic-product-addition-barycenter method.

The operation method shown in each step as an example is known as the Mamdani method (MIN-MAX-barycenter method) which is the most typical method for the fuzzy inference. FIG. 8 shows a conceptual diagram of the inference system. The effectiveness of the Mamdani method is verified in many practical examples. However, many operation methods different from the Mamdani method are proposed (e.g. Mizumoto, "Recent fuzzy control method", Mathematical Science, 333, March 1991). For example, it is reported that the "algebraic-product-addition-barycenter method" obtained by replacing the MIN and MAX operations of the Mamdani method with the algebraic sum operation (FIG. 9) produces effects superior to the the Mamdani method depending on the applied object or purpose. Moreover, there is a method for using the set element showing the maximum membership function value as a definite output instead of the barycenter value in the non-fuzzing step (maximum height method).

As described above, because the basic operation used in each step of the fuzzy inference process includes a plurality of systems in each step of the process, the system which should be used depends on the case. Moreover, because the theory for supporting which operation system is proper depending on the object or purpose is not adequately established, the actual result is that an inference system is determined depending on each case through trial and error. The same is true for the if-then rule and the number of input variables.

To realize the above fuzzy inference system as hardware, such pieces of hardware as a fuzzy inference chip and an inference board have been developed in recent years. For these pieces of hardware, however, inference systems, input variables to be set, and maximum value of rules are restricted by the existing hardware.

The existing fuzzy inference hardware has the following problems because the inference systems, number of input variables, and number of rules are restricted.

1. The number of input variables and the number of rules are excessively set large to prepare for variety of needs such as freedom for design. In fact, however, so many rules are not necessary and waste portions are produced in the hardware. This causes the hardware cost to rise. On the contrary, if the upper limits are set to slightly small values, it is impossible to process the necessary numbers of input variables and rules. These problems do not occur by performing a plurality of processings in time series. In this case, however, there is a disadvantage that the operation speed decreases as the numbers of input variables and rules increase.

In any case, it is difficult to constitute a fuzzy inference system with a necessary and adequate scale without sacrificing the operation speed.

2. Because inference systems are restricted, there is no assurance that the system is optimum for the purpose.

3

3. It is impossible to recombine systems while actually repeating trial and error and constitute an optimum inference system.

It is possible to design a hardware system dedicated to the purpose by using discrete parts. However, much labor is required for development and it is difficult to modify a system once constructed while repeating trial and error.

SUMMARY OF THE INVENTION

In consideration of these existing problems, it is an object of the present invention to provide flexible hardware by which a user can construct an optimum fuzzy inference system according to the purpose as shown below.

1. It should be possible to constitute a system with a necessary and adequate scale according to the numbers of input variables and rules to be set without sacrificing the operation speed.
2. It should be possible to select an operation system in each step of the inference process and to use an inference system meeting the purpose.
3. It should be possible to easily recombine systems according to necessity.

To solve the above problems, the fuzzy inference apparatus of the present invention constitutes the basic operation used in each step of the fuzzy inference process as an independent operation block and makes these blocks detachable. Moreover, a plurality of different basic operation system blocks are prepared for all or some steps of the fuzzy inference process and inputs/outputs of different basic operation blocks in the same step are compatible.

For the present invention, because the basic operation block in each step of the inference process is independent and detachable, it is possible to constitute a system with a necessary and adequate scale by combining these independent blocks. Because the system can be constituted in parallel, the operation speed does not decrease even if the operation load such as the number of input variables or rules increases. Because a plurality of basic operation blocks are prepared in each step and inputs/outputs of the basic operation blocks in the same step are compatible, it is possible to select the optimum operation system according to the purpose. Moreover, it is possible to recombine the systems according to necessity while repeating trial and error.

4

DESCRIPTION OF THE PREFERRED EMBODIMENTS

Embodiments of the present invention are described below by referring to the accompanying drawings.

EMBODIMENT 1

Figure 1:
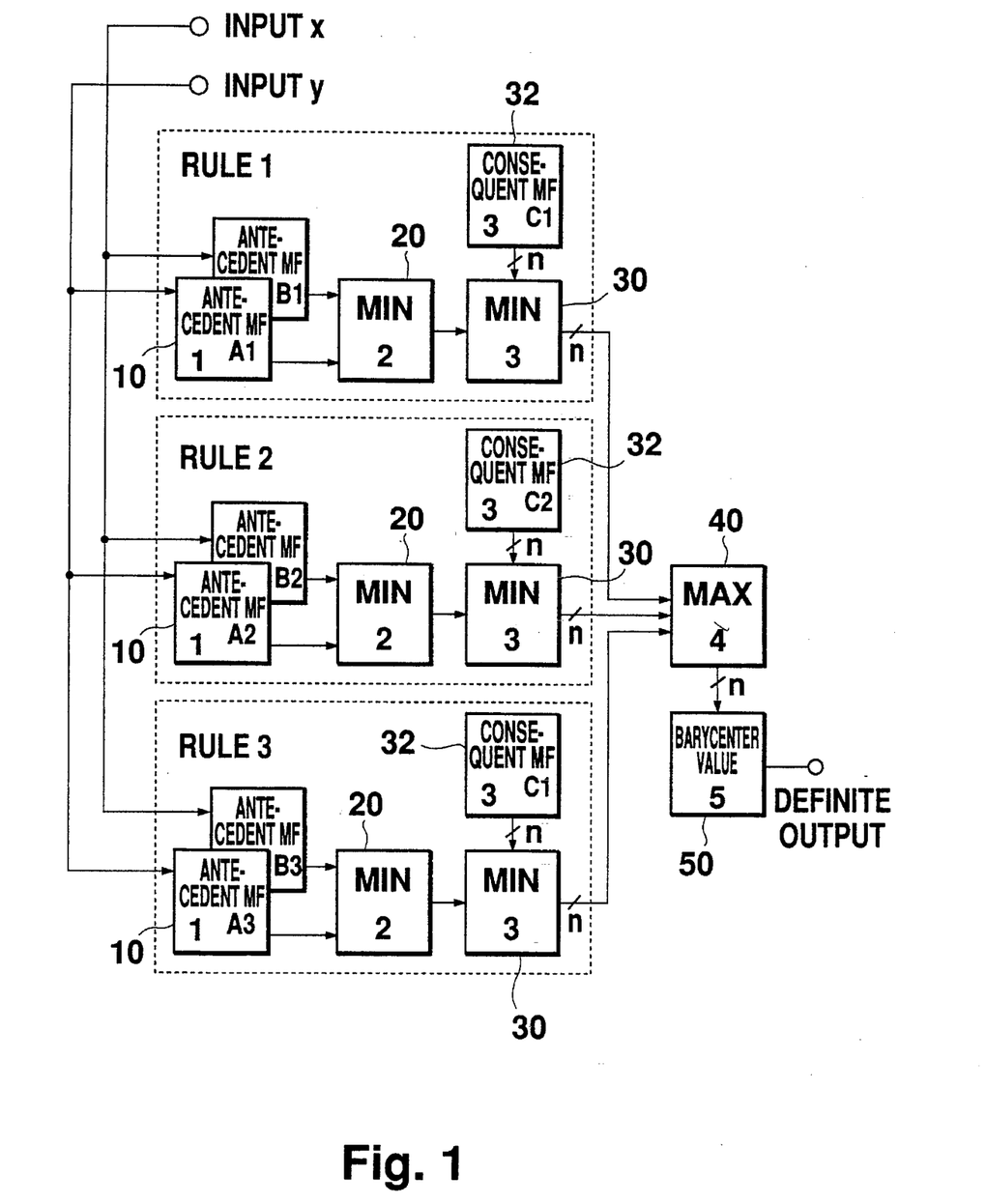
FIG. 1 shows a block diagram of Embodiment 1 of the Mamdani method of the present invention.

FIG. 1 shows an embodiment of a system for performing inference according to the Mamdani method (see FIG. 8) by using the present invention. The numbers 1 to 5 given in each basic operation block correspond to each step of the inference process previously described. A section enclosed by a broken line is a block for processing one if-then rule. This embodiment uses three rules and input variables "x" and "y" are used. Firstly, a set antecedent-part membership function value is obtained corresponding to input "x" and "y" respectively in a basic operation block 10, which value indicates degree of fidelity between the input and the antecedent-part membership function. The basic operation block 10 is designed so that the membership function can be previously set. The obtained fidelities are provided with the minimum operation by a basic operation block 20 and the fidelity for one rule is computed. A basic block 30 (minimum operation) truncates a consequent-part membership function generated at a basic operation block 32 by the above value. In this case, symbol "n" represents the number of elements of the entire set in which the consequent-part membership function (fuzzy set) is defined, in other words, it presents the resolution of the abscissa of the consequent-part membership function. Therefore, the block 30 has "n+1" inputs and "n" outputs. It is also possible to constitute one basic block by combining the blocks 30 and 32.

Because there are the same number of blocks 10 to 32 are as there are the rules, the consequent-part membership function truncated for each rule is obtained. This result is given to a basic operation block 40 and the above membership functions are unified into one membership function through the maximum operation. Outputs of the block 40 are a fuzzy set and a basic block 50 computes a definite value by non-fuzzing the fuzzy set. The output of the block 50 becomes the final output value of this inference system.

More than two inputs may be applied to the block 20 depending on the number of input variables. In this case, it is possible to process the minimum operation of multiple input by combining more than one block 20 like a tournament. It is also possible to previously set the number of inputs of the block 20 to 3 or more. Moreover, it is possible to correspond to the above by bringing the operation block inputs into the serial system.

The embodiment in FIG. 1 uses three rules. To increase the number of rules, however, it is only necessary to add the number of blocks enclosed by a broken line frame equal to the number of rules to be increased. It is also possible to change the number of input variables by changing the number of blocks 10. Because each basic operation block of blocks 10 to 50 is independent and detachable, it is possible to easily modify the hardware system according to the specifications of the number of rules or the number of input variables. For example, to output inference results as fuzzy values, it is also possible to use the output of the block 40 as the final output by removing the block 50.

EMBODIMENT 2

Figure 2:
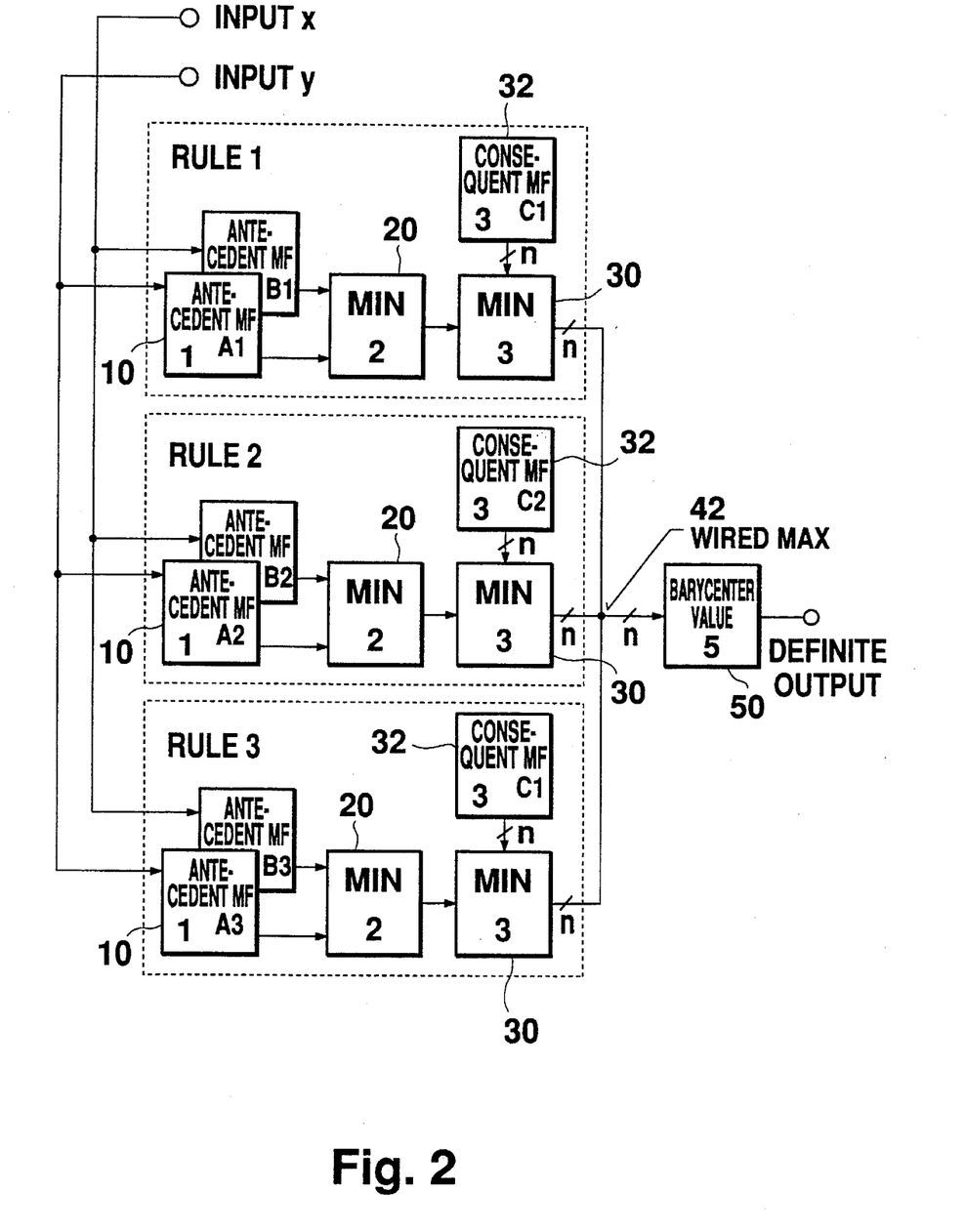
FIG. 2 shows a block diagram of Embodiment 2 of the present invention.
Figure 3:
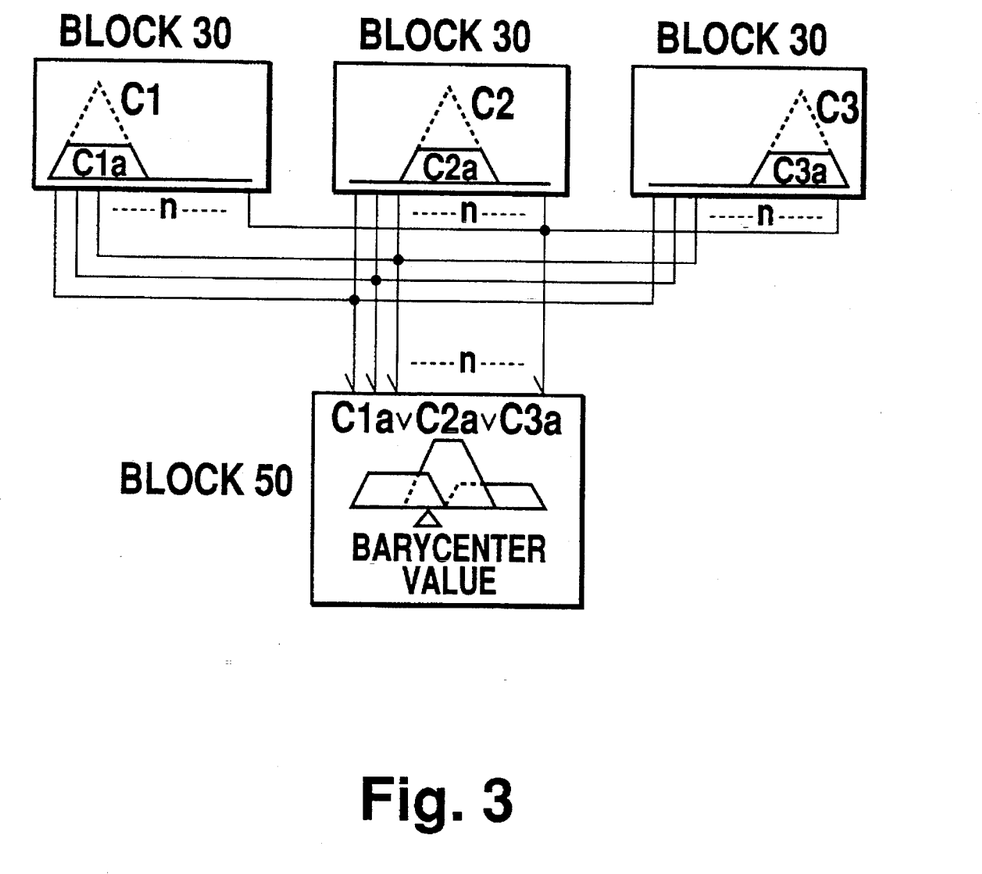
FIG. 3 is an illustration showing the operation state in Embodiment 2.

For Embodiment 1, "n" number of rules are necessary because the number of inputs of the basic operation block 40 increases according to the number of rules. It is possible to correspond to the above by using a plurality of blocks 40 connected like a tournament. However, the block 40 can be omitted by connecting the outputs of the block 30 at a node 42 as shown in FIG. 2 so that the block 30 can perform the wired max operation. This state is shown in FIG. 3. Symbols C1$a$, C2$a$, and C3$a$ are consequent-part membership functions truncated by each block 30.

EMBODIMENT 3

Figure 4:
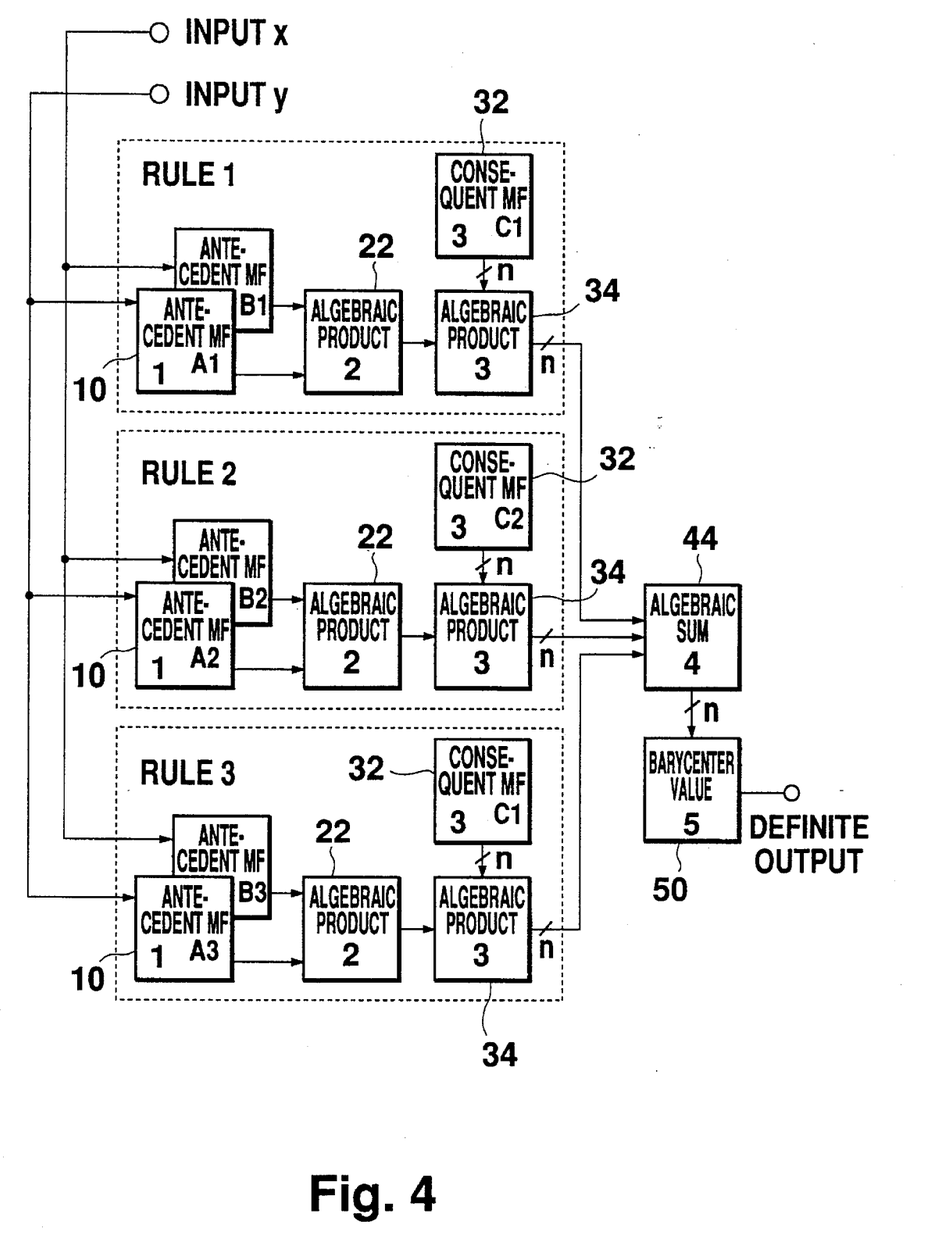
FIG. 4 shows a block diagram of Embodiment 3 of the present invention.

FIG. 4 shows an embodiment using the algebraic-product-addition-barycenter method (see FIG. 9) instead of the Mamdani method. This inference system is obtained by replacing the Mamdani-type minimum operation blocks 20 and 30 and the Mamdani-type maximum operation block 40 with the algebraic-product operation blocks 22 and 34 and the algebraic sum operation block 44 respectively. This embodiment makes it possible to easily change only a specific operation block to the other type of operation block because each basic operation block is independent and a plurality of types of operation blocks are compatible in inputs/outputs in each step of the inference process. To change the Mamdani method to the algebraic-product-addition-barycenter method, it is only necessary to replace the basic operation blocks 20, 30, and 40 with the blocks 22, 34, and 44.

Moreover, if various operations such as critical product, critical sum, intense product, and intense sum are prepared, it is possible to constitute a hardware system using the inference system according to different operations by replacing some operation blocks.

EMBODIMENT 4

Figure 5:
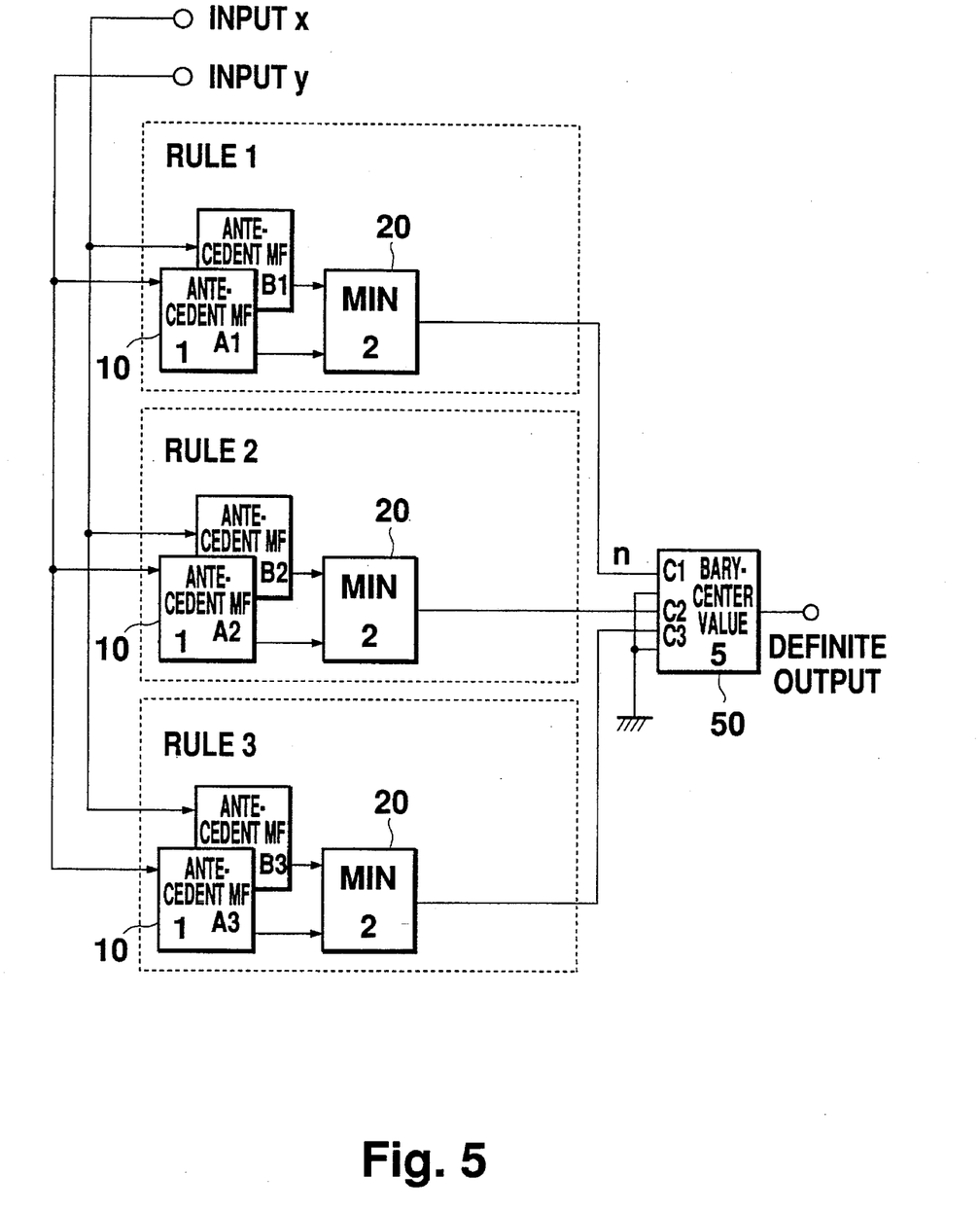
FIG. 5 shows a block diagram of Embodiment 4 of the present invention.
Figure 6:
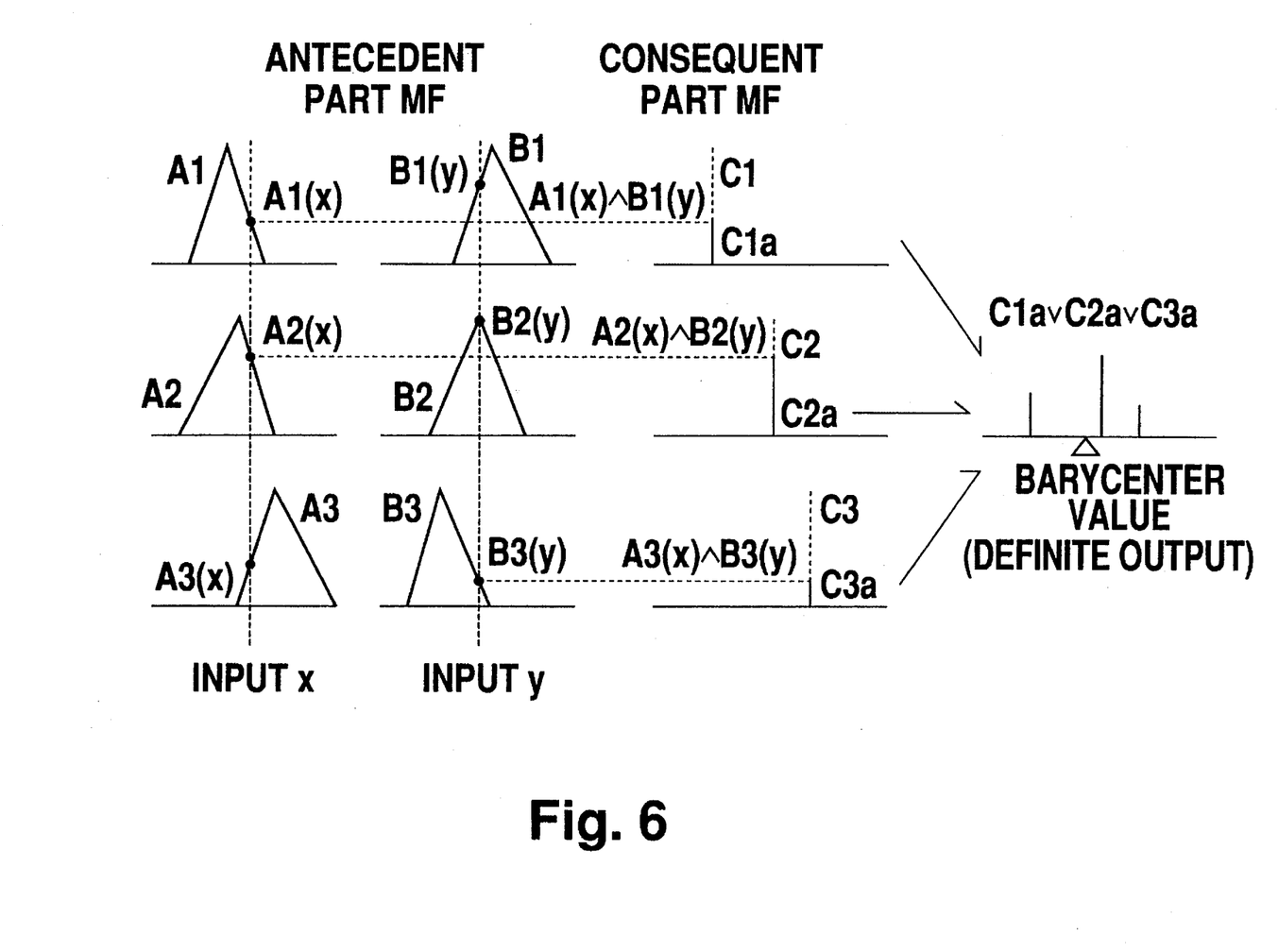
FIG. 6 shows a conceptual diagram of fuzzy inference according to the simplified inference method.

FIG. 5 shows a simplified inference method constituted by the present invention. The simplified inference method is an inference method using not a fuzzy set but a constant for the consequent part of the Mamdani method (see FIG. 8), which has been frequently used recently because of its simple computation procedure. FIG. 6 shows a conceptual diagram of this method. For this method, because the fidelity between input and antecedent part is directly used for conclusions C1$a$, C2$a$, and C3$a$ of a rule, processings such as truncation and unification are unnecessary. Therefore, a system is greatly simplified as shown in FIG. 5. Because the output of an operation block 20 represents a membership value of the conclusion of the rule, it is only necessary to directly input the value to a non-fuzzing block 50. In this case, the output of the operation block 20 must be connected to the input of a block 50 corresponding to the constant of the consequent part for each rule. An input terminal not corresponding to the consequent part of any rule is connected to the standard value indicating the membership value 0. If there are a plurality of rules with the equal consequent part, unification is necessary. In this case, however, it is sufficient to form the block 20 with the wired-MAX structure like Embodiment 2. Moreover, because the simplified inference method is regarded as a special case of the Mamdani method, it is also possible to directly use the system of Embodiment 1. In this case, it is only necessary to set a constant to the block 32 in FIG. 1 as a consequent-part membership function.

As described above, the present invention makes it possible to constitute fuzzy inference systems with various specifications as hardware of a necessary and adequate scale according to the object or purpose. The present invention is also effective to constitute an optimum fuzzy inference system while repeating trial and error because the system can be easily modified or extended.

Figure 7:
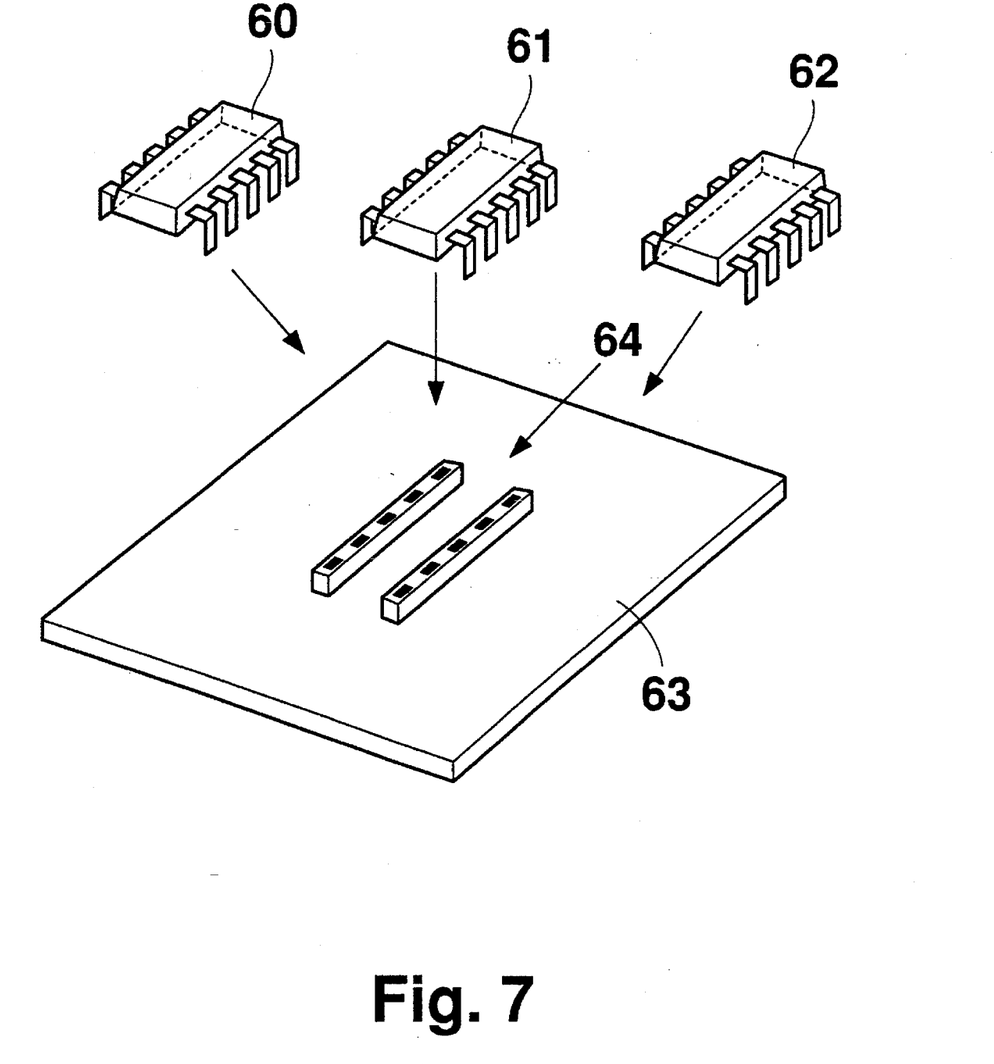
FIG. 7 shows perspective views of basic operation blocks of the present invention constituted as ICs respectively.

Moreover, it is expected that the fuzzy inference application field will be further expanded by realizing each of the basic operation blocks of the present invention as an individual IC. FIG. 7 shows basic operation blocks realized as individual ICs. In this case, a desired type of operation can be performed by preparing ICs 60, 61, and 62 of basic operation blocks with different operation systems and mounting them on a socket 64 set to a board 63. To change the type of operation to another type of operation, it is only necessary to remove the IC concerned from the socket 64 and insert another IC into the socket 64.

As described above, the present invention has the following advantages.

1. It is possible to constitute a system with a necessary and adequate scale according to the number of input variables or rules without sacrificing the operation speed.
2. It is possible to use an inference system suitable for a purpose because an operation system can be selected for each step of the inference process.
3. It is easy to recombine systems or modify a system according to necessity.
4. It is possible to construct a more complex inference system for performing a plurality of fuzzy inferences simultaneously or performing a multistage inference in which inference is further performed according to an inference result.

What is claimed is:

1. A fuzzy inference circuit board for performing fuzzy inference logic, the fuzzy inference circuit board comprising:
   a plurality of fuzzy inference rule circuits each defining a respective rule according to one of a plurality of different fuzzy inference methods, each fuzzy inference rule circuit having at least one modular section, each modular section having fixed input and output terminals compatible with and adapted to selectively receive different ones of a plurality of interchangeable inference circuits of different fuzzy inference method types configured as integrated circuits, wherein the fuzzy inference method for defining the respective rule is determined by the method type of the interchangeable inference circuit received in the modular section.

2. The fuzzy inference circuit board of claim 1, further comprising a modular output section receiving an output signal from each of the fuzzy inference rule circuits and computing a circuit board output according to one of the plurality of different fuzzy inference methods, the modular output section adapted to selectively receive different ones of a plurality of interchangeable output inference circuits of different method types, wherein the fuzzy inference method for computing the circuit board output is determined by the method type of the interchangeable output inference circuit received in the modular output section.

3. The fuzzy inference circuit board of claim 1, wherein the plurality of different fuzzy inference methods comprise a mamdani method and an algebraic-product-addition-barycenter method.

4. The fuzzy inference circuit board of claim 3, wherein the interchangeable inference circuit operating according to the mamdani method comprises at least one minimum operation circuit.

5. The fuzzy inference circuit board of claim 3, wherein the interchangeable inference circuit operating according to the algebraic-product-addition-barycenter method comprises at least one algebraic product operation circuit.

\* \* \* \* \*